United States Patent [19]

Obreanu et al.

[11] Patent Number: 4,470,438

[45] Date of Patent: Sep. 11, 1984

[54] RADIAL ARM SAW MORTISING ADAPTER

[76] Inventors: Philip Obreanu, 31 King St. East, Kingston, Ontario K7L 2Z5, Canada; Campbell W. Jones, 5 Emily St., Kingston, Ontario K7L 2W2, Canada

[21] Appl. No.: 428,157

[22] Filed: Sep. 29, 1982

[30] Foreign Application Priority Data

Oct. 23, 1981 [CA] Canada .................................. 388628

[51] Int. Cl.³ ............................................. B27F 5/06
[52] U.S. Cl. .................................. 144/72; 144/35 A; 83/574
[58] Field of Search .................. 144/72, 35 A; 83/574

[56] References Cited

U.S. PATENT DOCUMENTS

| 1,690,697 | 11/1928 | Palmu | 144/72 |
| 2,612,915 | 10/1952 | Moss | 144/72 |
| 2,621,686 | 12/1952 | Tompkins | 144/35 A X |
| 3,080,897 | 3/1963 | Winter | 144/35 A X |

Primary Examiner—Donald R. Schran
Attorney, Agent, or Firm—Stanley E. Johnson; Richard J. Hicks

[57] ABSTRACT

A mounting for use on a radial arm saw for use in cutting an accurate mortise. The chain saw is mounted on a bar adjustably attached to a plate which in turn has a bracket for clamping onto the housing of a motor of a radial arm saw. A drive for the chain saw is provided and which is driven by the motor of the radial arm saw.

3 Claims, 5 Drawing Figures

RADIAL ARM SAW MORTISING ADAPTER

This invention relates to the cutting or mortises in wood, or other materials of like-machinability characteristics by a power operated tool and more particularly to an adapter for converting a conventional radial arm saw to a mortising machine tool.

BACKGROUND OF INVENTION

Prior to now, mortises have been cut by hand with a chisel and mallet, or with a hollow chisel and axial internal bit, or with a router and finally with a highly sophisticated production line chain mortiser. The first three methods are quite slow in layout and set-up, as well as in the actual cutting. The industrial chain mortiser is very expensive and suited only to mass production in furniture or sash and door factories.

SUMMARY OF INVENTION

A principal object of the present invention is to provide a simple, relatively inexpensive device principally for use with a conventional radial arm saw adapting the same for mortising.

This invention concerns an adapter which, when mounted on a conventional radial arm saw, converts it to a chain mortiser. The bar with the chain thereon is mounted normally to operate in a plane parallel to the saw table, thus cutting a mortise in a workpiece parallel to the axis of the workpiece which is clamped to the saw table against the fence. The radial arm saw head, however, may be tilted to predetermined angles when the mortising needs so dictate. The length of the mortise may be varied by moving the workpiece along the fence. The width of the mortise may be varied by raising or lowering the radial arm saw head. The depth of the mortise is governed by the amount the operator plunges the radial arm saw head forward against a preset stop on the radial arm saw head carriage.

The unit is inexpensive to manufacture and is suited to light industrial or home workshop use. The adapter and use thereof is an improvement over the hollow chisel and drill press set-up or a router because of speed and ease of set-up time, and the resulting clean and accurate mortise.

There is provided particularly in accordance with the present invention a device for firmly holding a chain saw blade on the movable head of a radial arm saw for movement therewith and in such a manner so as to drive a chain saw on a blade by the motor of the radial arm saw, comprising:

(a) a base plate;
(b) clamp means secured to said base plate for detachably securing the latter to the movable head of a radial arm saw;
(c) a drive spindle journalled on said base plate and mounted in concentric relation with respect to the arbor of the radial arm saw so as to be driven by the same;
(d) means detachably coupling said spindle and saw arbor;
(e) detachable means to mount a chain saw blade on said base plate, said chain saw blade being adjustably movable selectively to vary the tension of a chain saw; and
(f) drive train means driven by said arbor and including means on said spindle on the base plate to drive the chain saw.

LIST OF DRAWINGS

In the drawings which illustrate the embodiments of the invention:
FIG. 1 is a plan or top view of a device provided in accordance with the present invention;
FIG. 2 is a front elevational view of FIG. 1;
FIG. 3 is a bottom view of FIG. 1;
FIG. 4 is a sectional view taken along line A—A of FIG. 2; and
FIG. 5 is a sectional view taken along line B—B of FIG. 2.

DETAILED DESCRIPTION OF PREFERRED EMBODIMENT

Figure 1:
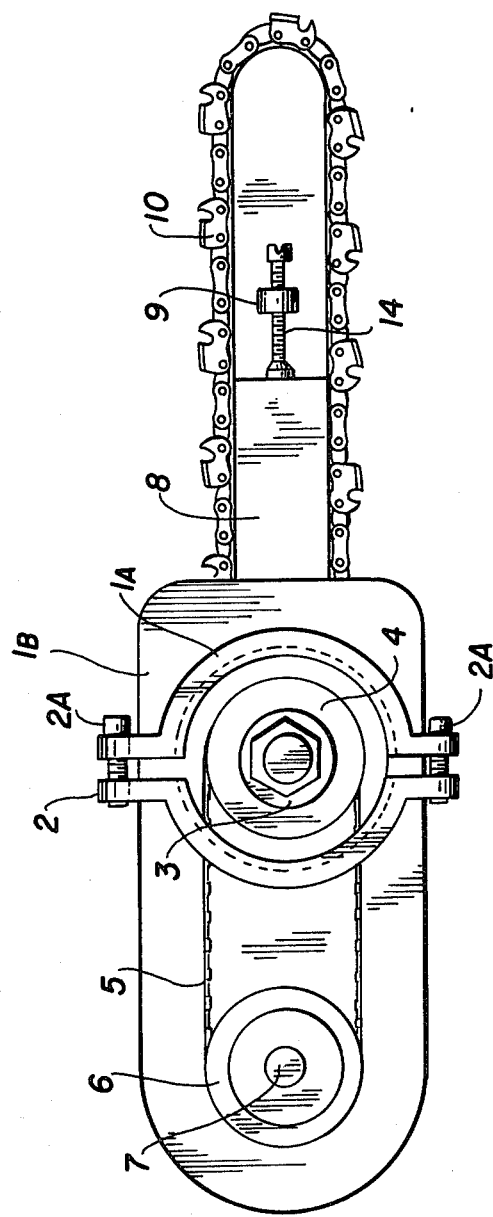
Figure 2:
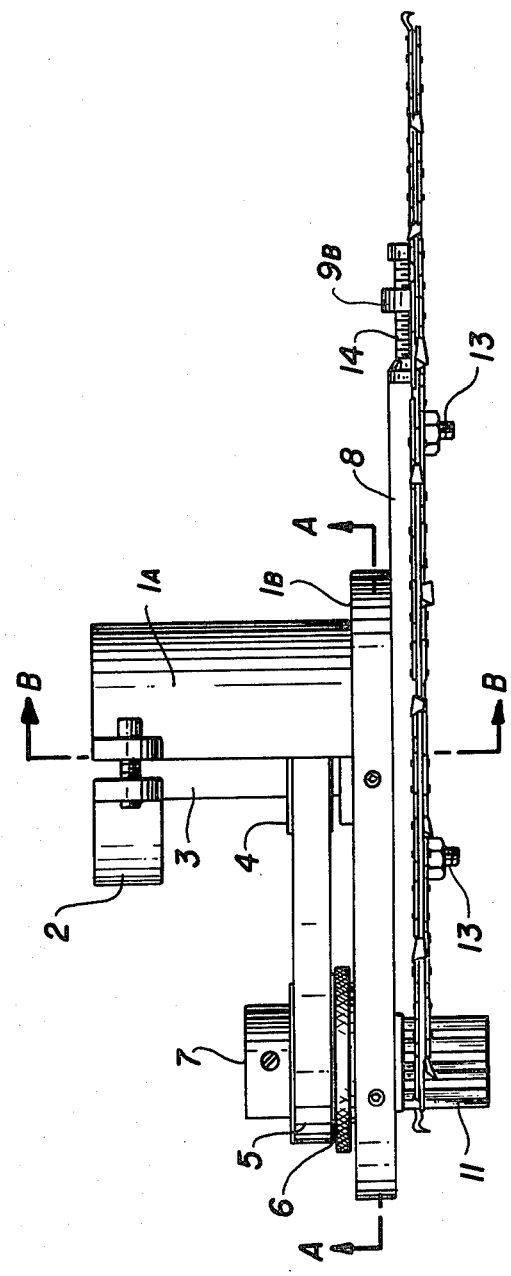
Figure 3:
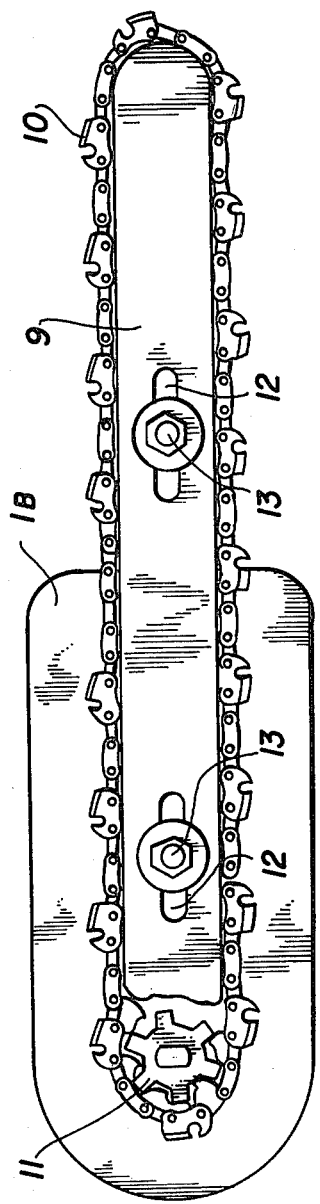
Figure 4:
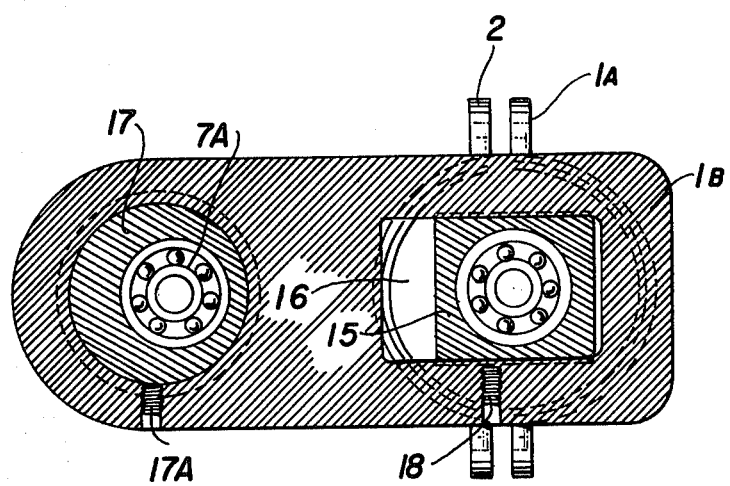

Referring to the drawings there is illustrated a semi-cylindrical bracket 1A rigidly secured to a base plate 1B. A semi circular cap 2 is detachably secured to bracket 1A by a pair of threaded studs 2A. The bracket 1A and cap 2 fit around an end portion of the housing of the motor of a radial arm saw and tightly clamped thereon by tightening the studs 2A.

A driving spindle 3 and a driven spindle 7 are mounted by suitable bearing means on the base plate 1A in spaced apart relation with their axes parallel to the axis of rotation of the radial arm saw arbor. The upper end of the driving spindle 3 has a hexagonal socket which fits over the hexagonal section of the saw arbor, while the lower end is mounted by a ball bearing in a block 15 longitudinally slidable in a slot 16 in the base plate 1B. The slidable block permits movement of the base plate and bracket when fitting the bracket onto the shoulder of the radial arm saw motor with the hexagonal socket end of the spindle fitted onto the arbor. The slidable block is secured or locked to the base plate by locking screw 18.

The driving spindle 3 is fitted with a sprocket 4 and by way of a drive belt 5 transmits power to spindle 7 through a sprocket 6 mounted on the latter. A chain saw drive sprocket 11 is mounted on spindle 7. Spindle 7 is journalled by a ball bearing 7A in an eccentric 17 in the base plate 1B, thus permitting adjustment of the tension of drive belt 5. The eccentric is locked in position by a set screw 17A.

A chain saw blade 9 is mounted on an anvil 8, secured to base plate 1B, by two clamping studs 13 passing through slots 12 in the blade 9. Chain tension is adjusted by a screw 14 threaded in a block 9B secured to blade 9. Screw 14 abuts against an end edge of anvil 8.

Figure 5:
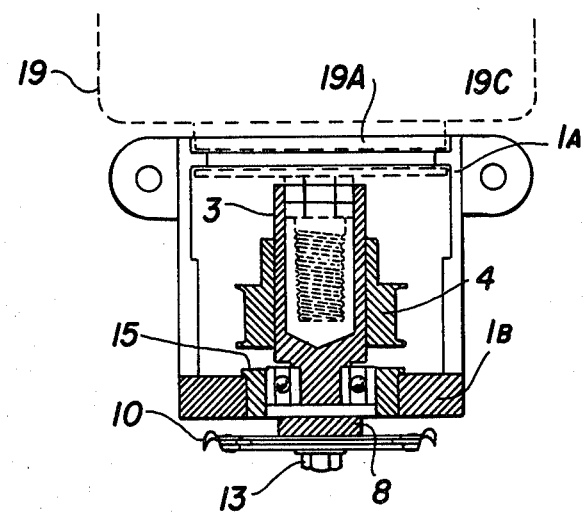

The outline of the radial arm saw motor housing and arbor are depicted by broken line 19 in FIG. 5, from which it will be noted the housing is provided with an annular groove 19A. Bracket 1A and cap 2 are provided with a rib 19C that fits into groove 19A.

The embodiments of the invention in which an exclusive property or privilege is claimed are defined as follows:

1. A device for firmly holding a chain saw blade on the movable head of a radial arm saw for movement therewith and in such a manner so as to drive a chain saw on a blade by the motor of the radial arm saw, said device comprising:

(a) a flat, elongate base plate;
(b) clamp means secured to said base plate for detachably securing the latter to the movable head of a radial arm saw, said clamp means comprising a part circular bracket secured to and projecting perpendicularly outwardly from one side face of the base plate and a clamping cap detachably secured to said bracket (c) a drive spindle journalled on said base plate for rotation about an axis perpendicular to the side faces thereof and located in concentric relation with respect to the arbor of the radial arm saw so as to be driven by the same; p1 (d) means detachably coupling said spindle and saw arbor;

(e) means detachably mounting a chain saw blade on a side face of said base plate, opposite said one side face, said chain saw blade being adjustably movable longitudinally aong said base plate selectively to vary the tension of a chain saw on said chain saw blade; and (f) drive train means driven by said saw arbor and including means on said spindle on the base plate to drive the chain saw, said drive train means including a second spindle journalled on said base plate for rotation about an axis parallel to and spaced from said driven spindle, pulley means on respective ones of said spindles and a belt extending around said pulleys, said belt and pulleys being located at said one side face of the base plate and gear means on said second spindle and located at an opposite side face of the base plate and meshing with the saw chain for driving the same.

2. A device as defined in claim 1 wherein said second spindle is journalled for rotation in an eccentric rotatably mounted in said base plate and including means to lock said eccentric.

3. A device as defined in claim 1 wherein said drive spindle is journalled for rotation in a bearing block slidably mounted on said base plate and including means for locking said bearing block on said base plate.

* * * * *